United States Patent [19]

Bos

[11] 4,415,599

[45] Nov. 15, 1983

[54] GRAVY OR SAUCE MIX

[75] Inventor: Kari E. O. Bos, Valencia, Calif.

[73] Assignee: Carnation Company, Los Angeles, Calif.

[21] Appl. No.: 377,776

[22] Filed: May 13, 1982

[51] Int. Cl.³ .................. A23L 1/195; A23L 1/40
[52] U.S. Cl. ............................ 426/578; 426/579; 426/589; 426/661
[58] Field of Search .............. 426/573, 575, 578, 579, 426/661

[56] References Cited

U.S. PATENT DOCUMENTS

| | | | |
|---|---|---|---|
| 3,974,034 | 8/1976 | Horn | 426/661 |
| 4,060,645 | 11/1977 | Risler | 426/589 |
| 4,165,391 | 8/1979 | Corbett | 426/589 |
| 4,291,066 | 9/1981 | Anema et al. | 426/578 |

FOREIGN PATENT DOCUMENTS 2026837  2/1980  United Kingdom .............. 426/589

*Primary Examiner*—Jeanette M. Hunter

[57] ABSTRACT

A dry mix composition which may be added directly to boiling water to form a sauce or gravy substantially free of lumps. The dry mix contains as essential ingredients, a thickening agent such a starch or flour, and maltodextrin, with the mix containing a weight ratio of maltodextrin to thickening agent of at least 1:1.

5 Claims, No Drawings

GRAVY OR SAUCE MIX

BACKGROUND OF THE INVENTION

This invention relates to a dry mix for the preparation of gravies and sauces. More particularly, the invention relates to a dry mix which may be added directly to boiling water to form a gravy or sauce substantially free of lumps.

Dry mix compositions, which typically contain a thickening agent such as starch or flour, together with flavoring and coloring agents, are widely used today to prepare gravies and sauces. In preparing a gravy or sauce from such a mix, the dry mix is dispersed in cold water and the dispersion gradually heated to boiling with constant agitation to gelatinize the starch and thereby thicken the liquid to the desired extent. This procedure must be carried out with care in order to avoid the formation of lumps in the thickened product. Thus, if the mix is not stirred vigorously during heating or if the dispersion is heated too rapidly, lumps are formed in the gravy or sauce, due to the gelatinization of starch on the outer surface of agglomerates of starch particles, which prevents absorption of water and gelatinization of starch particles within the agglomerates. This results in a gravy or sauce containing a number of lumps of substantial size composed of dry flour on the inside surrounded by a gelatinized starch coating. These lumps cannot be dispersed even with vigorous and extended stirring, and must be removed, usually by straining, before the gravy or sauce is used. Such lumps of ungelatinized, dry starch particles are also formed when attempts are made to form a gravy or sauce by adding a conventional dry mix composition directly to hot water.

A number of procedures have been suggested heretofore in order to avoid the formation of lumps in the preparation of gravies and sauces using a dry mix composition. For example, U.S. Pat. No. 2,909,431 discloses the use of a dry mix for preparing gravies and sauces comprising (a) starch or flour, (b) a separating component selected from the group consisting of shortening, non-fat milk solids, and whey solids, and (c) an alkaline leavening agent such as sodium acid pyrophosphate or dicalcium phosphate. U.S. Pat. No. 3,607,306 discloses the addition of gelatin or other hydrophillic colloid (such as guar gum, gum agar, and the like) to a dry, starch-containing gravy mix. British Patent Application No. 2,026,837 A discloses a dry gravy mix in which the thickening agent consists of a heat-moisture-treated potato starch having retarded thickening properties. However, such prior proposals significantly increase the cost of the dry mix and make it economically unattractive to many consumers.

SUMMARY OF THE INVENTION

The present invention provides an improved dry mix composition for the preparation of gravies and sauces which contains a thickening agent, such as starch and/or flour, and maltodextrin, with the maltodextrin being present in the dry mix composition in an amount sufficient to provide a weight ratio of maltodextrin to thickening agent of at least 1:1. The use of a weight ratio of maltodextrin to thickening agent of at least 1:1 provides a dry mix which may be added directly to boiling water, with a minimum of stirring, typically 30–60 seconds, to form a smooth, lump-free, sauce or gravy. The dry mix may also include flavoring agents, coloring agents, food components, nutritional agents, fillers, diluents and the like. Thus, the present invention provides a one-step gravy or sauce mix in which the desired gravy or sauce may be prepared by the addition of the dry mix directly to boiling water. The use of the dry mix composition of this invention obviates the two-step procedure commonly required to produce a lump-free sauce or gravy.

DETAILED DESCRIPTION OF THE INVENTION

In accordance with the present invention, any of the starches or starch-containing materials which have conventionally been used as thickening agents in dry gravy and sauce mixes may be used in the dry mix composition of this invention. Thus, thickening agents which may be used include a wide variety of starches, such as corn, potato, wheat, rice, tapioca and waxy maize starches. Suitable starch containing materials which may be used include cereal flours derived from these sources, including wheat flour, potato flour, rice flour and the like. Other suitable thickeners may, if desired, also be used in relatively minor amounts in combination with the starch, which comprises the principal thickening agent. For example, cellulose gums such as carboxy methyl cellulose, and cold water-soluble gums such as xanthan gum and guar gum, may optionally be used as thickening agents in combination with the starch material.

The thickening agent is included to aid in increasing the viscosity when the dry mix is reconstituted with water or other aqueous liquids, and to provide body and texture to the reconstituted product. Corn starch is the preferred thickening agent of the present invention. The thickening agent is generally employed in an amount of from about 15% to 40% by weight of the dry mix composition, with an amount in the range of between 20% to 30% by weight of the dry mix being preferred.

In order to enable the dry, starch-containing mix of the present invention to be added directly to boiling water without forming lumps, the dry mix contains, as an essential ingredient, maltodextrin, with the maltodextrin being present in the mix in an amount sufficient to provide a weight ratio of maltodextrin to thickening agent of at least 1:1. While the ratio of maltodextrin to thickening agent in the dry mix may, of course, be greater than 1:1, such greater amounts provide no significant advantage in providing a smooth, lump-free gravy or sauce. However, when the amount of maltodextrin in the dry mix is such as to provide a ratio substantially less than said 1:1 weight ratio with the thickening agent, the mix cannot be added directly to boiling water without the formation of undesirable lumps.

Because of taste and flavor considerations, it is preferred to use a maltodextrin having a dextrose equivalent of about 9.0–12.0. While maltodextrins having a lower dextrose equivalent (e.g. 5.0) or a higher D.E. (e.g. 20–35) are effective in preventing the formaton of lumps when the dry mix is added directly to boiling water, the taste, flavor, and aroma of the reconstituted sauce or gravy is less desirable than that obtained through the use of maltodextrin having a dextrose equivalent of about 9.0–12.0. Maltodextrin is a polysaccharide which constitutionally is midway between dextrin and maltose, and is produced from the starch material of barley during modification in the manufacture of malt. Typically, over 80% of maltodextrin consists of pentasaccharides and above. A suitable maltodextrin for use in the present invention is MALTRIN M-100, supplied by Grain Processing Corporation of Muscatine, Iowa.

The dry mix composition of the present invention may also contain a wide variety of conventional ingredients such as flavoring agents, coloring agents, nutritional agents, food components, fillers, diluents, and the like to provide a dry product which may be converted into a flavored sauce or gravy by direct addition to boiling water or other aqueous liquids. For example, by incorporating suitable fats, hydrolyzed vegetable protein, meat flavors and colors, a one-step, meat flavored gravy mix composition may be obtained. Similarly, with suitable choice of ingredients, e.g. cheese solids, whey solids, fat, and coloring, a one-step cheese sauce composition may be obtained.

The dry mix composition of this invention can be reconstituted for consumption by adding it directly to boiling water or other aqueous liquids and briskly stirring for 30-60 seconds thereby resulting in a smooth, lump-free, sauce or gravy. While the proportion of dry mix to water used to produce the reconstituted product will vary considerably depending upon the composition of the mix, typically a sauce is obtained by adding one part of the dry mix to less than about 5 parts by weight of water, while a gravy is obtained by adding 1 part of the mix to more than 5 parts by weight of water, usually between about 5.5 to 10 parts of water, per part of the dry mix.

The invention is further illustrated by the following examples.

EXAMPLE 1

A dry, chicken flavor gravy mix was prepared having the following composition:

| Ingredient | Percent By Weight |
| --- | --- |
| Corn Starch | 24 |
| Maltodextrin | 24 |
| Whey | 11 |
| Flavoring and coloring (Hydrolyzed Vegetable Protein, powdered chicken, CSS, MSG, nonfat dry milk, salt, caseinate, spices, colors) | 31 |
| Fat | 8 |
| Flowing Agent | 2 |

The ingredients were blended until a uniform mixture was obtained. 301 gms of the resulting dry mix was added directly to 1775 ml of water which had been heated to a rolling boil, and whisked briskly for 40 seconds over high heat. The dry mix dispersed readily in the boiling water to form a gravy having an excellent, smooth texture, free of lumps. Similar results are obtained when other starches, such as potato starch, rice starch and the like are substituted for the corn starch in the composition.

EXAMPLE 2

In order to demonstrate the affect of the ratio of maltodextrin to thickening agent on the properties and characteristics of the dry gravy or sauce mix of this invention, a series of dry mixes were prepared. The dry mixes were the same as that set out in Example 1 above, with the exception that the amount of maltodextrin in the mix was varied, as indicated in Table 1 below. The dry mixes thus prepared were evaluated in the same manner, namely, 301 gms of the dry mix was added directly to 1775 ml of boiling water, and whisked briskly for 40 seconds over high heat to form a gravy. A 25 gm sample of each gravy thus formed was taken and studied to determine the presence or absence of lumps, and the number and size of lumps present, if any. The description of the dry mixes tested and the results of the tests are set out below in Table 1.

TABLE 1

| Mix No. | Amount Maltodextrin (gms) | Ratio Maltodextrin: Starch | Results |
| --- | --- | --- | --- |
| 1 | 24.15 | 1:1 | smooth texture gravy; 1 lump, 1 mm in size, per 25 gm sample. |
| 2 | 0 | 0:1 | gravy very lumpy; 10 lumps, 2-3 mm in size, per 25 gm sample. |
| 3 | 4.8 | 0.2:1 | gravy very lumpy; 7 lumps, 3 mm in size, per 25 gm sample. |
| 4 | 9.7 | 0.4:1 | gravy fairly lumpy; 5 lumps, 2-3 mm in size, per 25 gm sample. |
| 5 | 14.5 | 0.6:1 | gravy fairly lumpy; 3 lumps, 2-3 mm in size, per 25 gm sample. |
| 6 | 19.3 | 0.8:1 | gravy fairly lumpy; 5 lumps, 5 mm in size, per 25 gm sample. |
| 7 | 29.0 | 1.2:1 | smooth texture gravy; 1 lump, 1 mm in size, per 25 gm sample. |
| 8 | 33.8 | 1.4:1 | smooth texture gravy; 1 lump, 1 mm in size, per 25 gm sample. |

The results of these tests clearly show that a weight ratio of maltodextrin to starch of at least 1:1 is necessary in order to provide a smooth texture gravy, substantially free of lumps, when the dry mix is added directly to boiling water.

EXAMPLE 3

Another series of tests was run using the dry mix composition of Example 1 in which the maltodextrin was replaced by an equal amount by weight of another material suggested in the prior art for use in gravy mixes. These dry mixes were evaluated in accordance with the procedure set out in Example 2. The description of the dry mixes tested and the results obtained are set out in Table 2.

TABLE 2

| Mix No. | Material Used | Ratio Material: Starch | Results |
| --- | --- | --- | --- |
| 9 | Lactose | 1:1 | gravy fairly lumpy; 3 lumps, 2 mm in size, per 25 gm sample. |
| 10 | Non Fat Dry Milk | 1:1 | gravy very lumpy; 10 lumps, 3-4 mm in size, per 25 gm sample. |
| 11 | Corn Syrup Solids (42DE) | 1:1 | gravy fairly lumpy; 5 lumps, 1-2 mm in size, per 25 gm sample. |

EXAMPLE 4

A dry beef flavor gravy mix was prepared having the following composition, in which the weight ratio of maltodextrin to thickening agents was 1:1.

| Ingredient | Percent By Weight |
| --- | --- |
| Thickening Agents | |
| Corn Starch | 20 |
| Wheat Flour | 10 |
| Cellulose gum | 3 |
| Xanthan gum | 0.5 |
| Maltodextrin | 33 |
| Flavoring and coloring | 21 |
| Fat | 12 |
| Flowing Agent | 0.5 |

Two Hundred Twenty One grams of the dry mix composition was added directly to 1775 ml of boiling water and whisked briskly for 40 seconds over high heat. The dry mix dispersed readily in the boiling water to form a gravy having a smooth texture, free of lumps.

It should be noted that in the examples the dry mix composition is added directly to boiling water as this is a severe test of the tendency toward the formation of lumps. In actual use, the dry mix may be added to hot water below the boiling point for acceptable results.

What is claimed is:

1. In a dry mix composition comprising a starch-containing thickening agent, flavoring, coloring and nutritional agents which upon addition to water reconstitutes to form a gravy or sauce, the improvement which consists essentially of including in the dry mix from 15% to 45% by weight of said thickening agent, and maltodextrin in an amount sufficient to provide a weight ratio of maltodextrin to thickening agent of at least 1:1, whereby the dry mix may be added to boiling water to form a gravy or sauce substantially free of lumps.

2. The dry mix defined in claim 1 in which the thickening agent is selected from the group consisting of starch and starch-containing materials.

3. The dry mix defined in claim 2 in which the mix also contains a minor amount of a thickening agent selected from the group consisting of cellulose gums and cold water soluble gums.

4. The dry mix defined in claim 1 in which the maltodextrin is present in the mix in an amount sufficient to provide a weight ratio of maltodextrin to thickening agent in the range of between about 1:1 to 1:4:1.

5. A method of forming a gravy or sauce substantially free of lumps which comprises
providing a dry mix composition containing from 15% to 45% by weight of a thickening agent selected from the group consisting of starch and starch-containing materials, maltodextrin in an amount sufficient to provide a weight ratio of maltodextrin to thickening agent of at least 1:1, flavoring, coloring and nutritional agents, and
adding said dry mix composition to boiling water, with stirring, whereby the dry mix is reconstituted to form a gravy or sauce substantially free of lumps within about 30–60 seconds.

* * * * *